United States Patent
Almudafier (10) Patent No.: US 9,285,779 B2
(45) Date of Patent: Mar. 15, 2016

(54) SMART ALARM CLOCK SYSTEM DEVICE

(71) Applicant: Abdullah J Almudafier, Riyadh (SA)

(72) Inventor: Abdullah J Almudafier, Riyadh (SA)

(*) Notice: Subject to any disclaimer, the term of this patent is extended or adjusted under 35 U.S.C. 154(b) by 87 days.

(21) Appl. No.: 14/242,128

(22) Filed: Apr. 1, 2014

(65) Prior Publication Data

US 2015/0277388 A1 Oct. 1, 2015

(51) Int. Cl.
- *G04G 15/00* (2006.01)
- *G06K 9/00* (2006.01)
- *G06T 7/00* (2006.01)
- *G04G 13/02* (2006.01)

(52) U.S. Cl.
CPC ............... *G04G 15/00* (2013.01); *G04G 13/02* (2013.01); *G06K 9/00664* (2013.01); *G06T 7/0022* (2013.01)

(58) Field of Classification Search
CPC .............................. G04G 13/02; G04G 15/00
See application file for complete search history.

(56) References Cited

U.S. PATENT DOCUMENTS

| | | | | |
|---|---|---|---|---|
| 5,524,101 A * | 6/1996 | Thorgersen | ............ | G04B 19/32 368/10 |
| 5,686,882 A | 11/1997 | Giani | | |
| 6,285,289 B1 * | 9/2001 | Thornblad | ............ | G08B 17/10 340/539.1 |
| 7,280,096 B2 | 10/2007 | Marvit et al. | | |
| 7,948,831 B2 | 5/2011 | Orcutt et al. | | |
| D708,846 S * | 7/2014 | Waldon | ............ | D3/218 |
| 2004/0201775 A1 | 10/2004 | Brake et al. | | |
| 2006/0244613 A1 | 11/2006 | Myers | | |
| 2007/0200716 A1 | 8/2007 | Haase et al. | | |
| 2007/0216537 A1 * | 9/2007 | Park | ............ | G04C 21/34 340/691.1 |
| 2011/0134805 A1 | 6/2011 | Cho et al. | | |
| 2012/0120770 A1 | 5/2012 | Li | | |
| 2012/0140599 A1 | 6/2012 | Liao | | |
| 2012/0232449 A1 | 9/2012 | Arnstein | | |

(Continued)

FOREIGN PATENT DOCUMENTS

| | | |
|---|---|---|
| JP | 2005241286 A | 9/2005 |
| JP | 2005328467 A | 11/2005 |
| KR | 2012007732 A | 1/2012 |

OTHER PUBLICATIONS youtube.com/watch?v=aSLKwrToi4Q&feature=youtu.be ; Apr. 10, 2012.*

(Continued)

*Primary Examiner* — Amy Cohen Johnson
*Assistant Examiner* — Jason Collins
(74) *Attorney, Agent, or Firm* — Oblon, McClelland, Maier & Neustadt, L.L.P (57) ABSTRACT

A smart alarm clock system device includes an imaging device, a memory used to store predetermined values and images, an emitter used activate an alarm signal; and a processor having circuitry used to set an alarm time, cause the emitter to activate the alarm signal when a current time of the clock corresponds to the predetermined value, compare, when the alarm signal is activated and in response to capture an image, the captured image to the predetermined image, and deactivate the alarm signal and reset the alarm time for the pre-determined value, when the captured image corresponds to the predetermined image stored in memory, compare, when the alarm signal is activated and in response to capture of an image, the captured image to the second predetermined image, and deactivate the alarm signal, when the captured image corresponds to the second predetermined image.

16 Claims, 10 Drawing Sheets

(56) References Cited

U.S. PATENT DOCUMENTS

2012/0327748 A1    12/2012   Lee
2013/0111579 A1    5/2013   Newman et al.

OTHER PUBLICATIONS

3M, "One Piece Tracking System", http://solutions.3m.com/wps/portal/3M/en_US/ElectronicMonitoring/Home/ProductsServices/OurProducts/GPSTrackinq/OnePieceGPSTrackingSystem/, (2 pages).

Jon Phillips, Jawbone Up, "Up Falls Down", Dec. 9, 2011, (10 pages).

The Sharper Image, "Motion Activated Alarm Clock", http://www.sharperimage.com/si/view/product/Motion-Activated-Alarm-Clock/201227, (2 pages).

* cited by examiner

SMART ALARM CLOCK SYSTEM DEVICE

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Alarm clocks have been a major part of many people's lives for decades. People use alarm clocks to wake up at a certain time or to snooze to prolong their sleep for short periods of time. However, making sure the user is up and moving remains a challenge for most alarm clocks, especially when dealing with heavy sleepers and people with disabilities, as in such cases using sound only as an alarm signal may not be enough. As a result people may miss important meetings, events, appointments and sometimes emergencies.

Generally, most alarm clocks majorly focus on activating an alarm signal at a predetermined time; while this is a key feature a healthy user might still fall back to sleep if they are really tired, and a user with disabilities might not even be able to notice the signal. Different people are different, what might work for a certain user might not work for another so far, most alarm clocks target a single group of users in a single manner.

SUMMARY

A smart alarm clock system device includes a clock that is used to indicate time, an imaging device that is used to capture an image, a memory that is used to store at least one alarm time as a predetermined alarm time, an alarm period as a predetermined alarm period, a night time as a predetermined night time, and at least one captured image as a predetermined image, an emitter that is used to activate an alarm signal; and a processor having circuitry used to set an alarm time, cause the emitter to activate the alarm signal when a current time of the clock corresponds to the at least one alarm time, compare, when the alarm signal is activated and in response to capture of an image by the imaging device, the captured image to the at least one predetermined image, and deactivate the alarm signal and reset the alarm time for the at least one pre-determined alarm period stored in memory. When the captured image corresponds to the at least one predetermined image stored in memory, compare, when the alarm signal is activated and in response to capture of an image by the imaging device, the captured image to the at least one predetermined image stored in memory, and deactivate the alarm signal, when the captured image corresponds to the at least one predetermined image.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
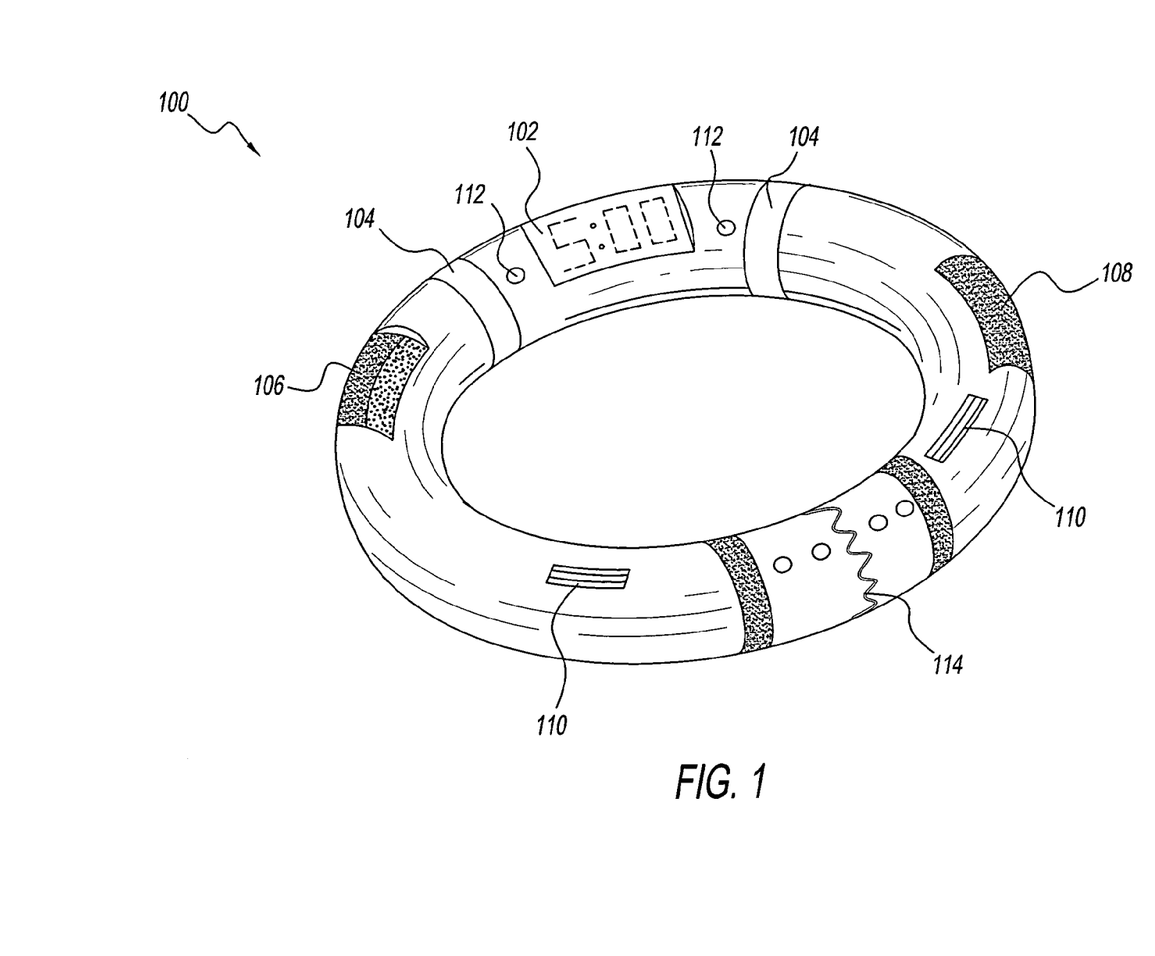
FIG. 1 is a perspective view of a smart alarm system device according to one example.

FIG. 1 is an illustrative view of a smart alarm system device 100. In selected embodiments, the smart alarm system device 100 may be in the shape of a bracelet, necklace or other fastening device having electrical and/or software components such as a display screen 102 used to display information, a light source 104 that is used to emit light, a smoke sensor 106 that it used to detect smoke, a motion sensor 108 that is used to detect motion, an emitter 110 that is used to emit either sound or vibration, and an imaging device 112 that is used to take images. While the term bracelet is used hereafter, the term bracelet is understood to mean a bracelet, necklace or other fastening device. The bracelet is also provided with the lock 114 that is used to secure the device around the wrist or other appendage of a user in selected embodiments.

The smart alarm clock system device 100 is light, comfortable and convenient while also providing a plurality of features, for example: a clock, an alarm, a light source and a fire detector. The display screen 102 is used to display the current time, the light sources 104 are used to facilitate movement at night without causing any inappropriate noises or messes, the smoke detector 106 is used to detect smoke in the case of fires, the motion sensor 108 is used to detect motion of the device, the emitters 110 are used to generate an alarm signal, the imaging device 112 is used to capture images that are used to deactivate an alarm, and the lock 114 is used so that user is forced to deactivate the alarm twice, which is another way of forcing heavy sleepers to wake up. The functionalities of the parts 102-114 is further described below.

Figure 2A:
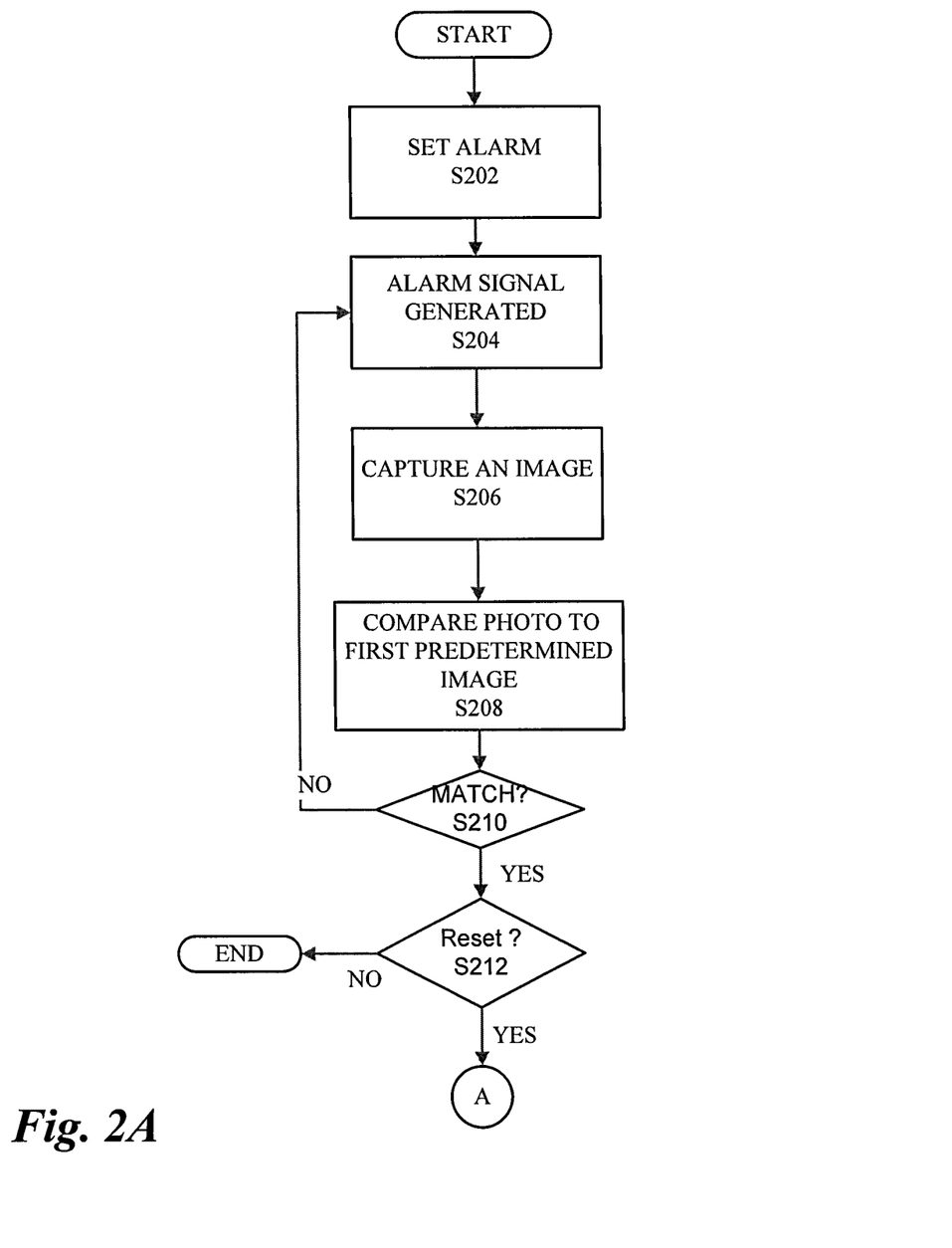
FIGS. 2A and 2B are a flowchart illustrating a process of setting, resetting, activating and deactivating an alarm according to one example.
Figure 2B:
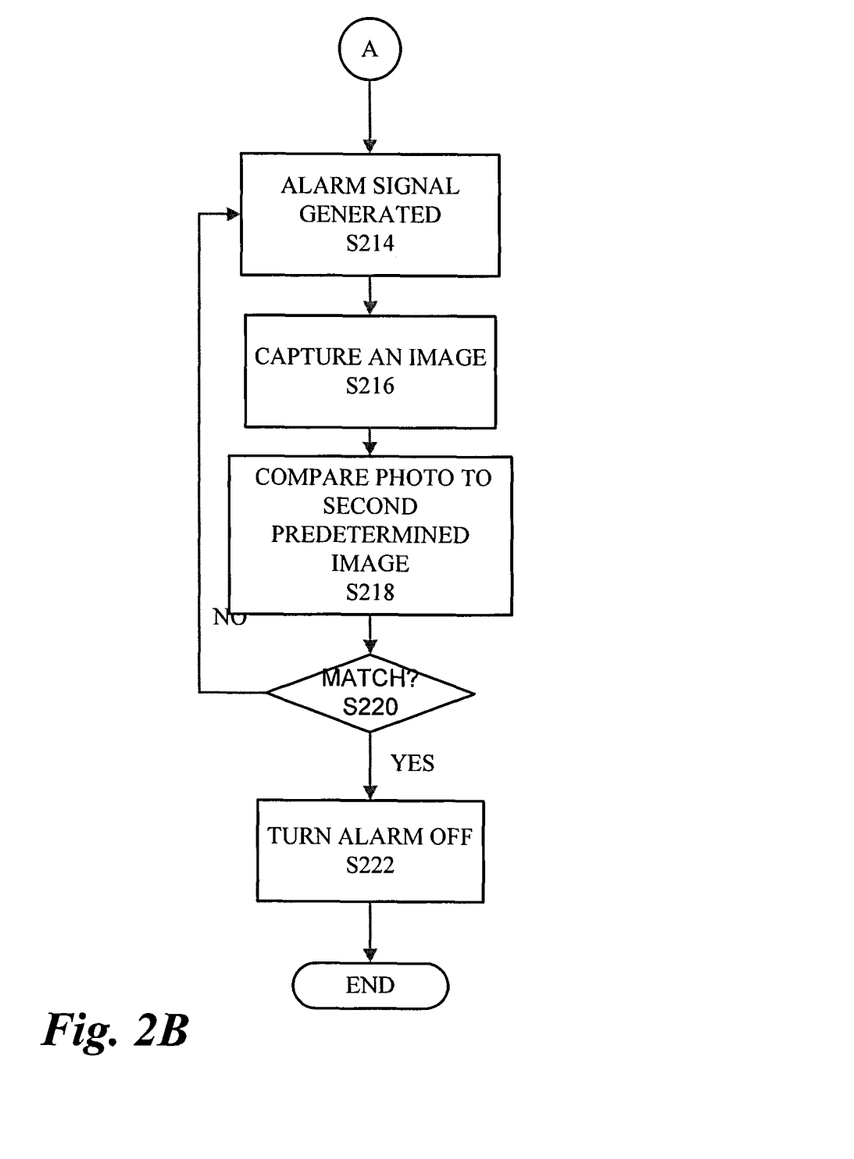

FIGS. 2A and 2B are flowcharts illustrating a process of setting, resetting, activating and deactivating a alarm of the smart alarm system device according to one example. The process begins at step S202 which is a waiting state where the smart alarm system device waits for an alarm to be set. If an alarm of the smart alarm system device has not been set, the system continues to check at step S202 until an alarm has been set. In selected embodiments, the alarm may be set via manual input, voice input or remotely via an external connection. Once an alarm has been set the system proceeds to step S204 where the alarm goes off and an alarm signal is generated. In selected embodiments the alarm signal can be a sound, a vibration, a light or other alarm signals. Accordingly, it is assumed at this point that a specific alarm time has been set and that the time has been reached at which the alarm was set such that an alarm signal is generated by the smart alarm system device 100. Then at step S206 the imaging device 112 is used to capture an image in response to the alarm signal being generated and in an attempt to reset the alarm clock. In step S208 the smart alarm system device compares, via for example a CPU 800 illustrated in FIG. 8, the captured image to a first predetermined image stored in a memory of the smart alarm system device 100. The first predetermined image stored in memory can be captured and stored ahead of time by the user based on his surroundings. Therefore, as described further therein, the user may use a predetermined image that is not near the user's bed thereby advantageously requiring the user to get up to take a picture and reset the alarm and lower the chance that the user doesn't wake up from the alarm.

At step S210, the smart alarm system device determines whether the image captured by the smart alarm system device at step S208 matches with the first predetermined image. To determine whether the images match, the pixels of each image can be compared and a computed difference can be compared to a threshold as would be understood by one of ordinary skill in the art. If above the threshold then it may be determined that the images do not match and if below the threshold it may be determined that the images are a close enough match. In other words, the match does not have to be perfect but close enough so that the smart alarm system device can determine that a user has attempted to capture an image corresponding to the first predetermined image. In selected embodiments, the threshold may be manually or automatically adjusted to require the user to capture a more similar or less similar image based on the desires of the user.

If the two images do not match, to the process reverts to step S208 so that the user can again attempt to capture a image for comparison to the first predetermined image. However, if the images described with respect to steps S206 and S208 match at step S210, the process proceeds to step S212. At step S212, the processor is programmed to ask the user if he or she wants to reset the alarm. This can be done via the display screen 100 or by sound via the emitter 208. If the answer is no at step S212, then the alarm is deactivated. However, if the answer is yes at step S212, then the process proceeds to that illustrated in FIG. 2B at which point the processor resets the alarm for a predetermined amount of time. In other words, the alarm is deactivated but is set such that it will be initiated again after the predetermined amount of time has elapsed. The predetermined amount of time may be preset or manually created by the user and is stored in the memory of the smart alarm system device.

Therefore, the system continuously checks whether the alarm signal has been generated at step S214. If no at step S214 then the predetermined amount of time has not elapsed and the smart alarm system device continues to check of the generation of the alarm signal. Once the alarm signal is generated (YES at step S214), the process proceeds to step S216 at which point the imaging device 112 of the smart alarm system device is used to capture a second image. Once the image has been captured at step S216, the processor compares at step S218 the second captured image to a second predetermined image stored in memory. The second predetermined image stored in memory can be captured and stored ahead of time by the user based on his surroundings for similar reasons discussed herein. For example, the second predetermined image may be further away from a location of the user (i.e. car, different part of a domicile) such that the user has to travel further in order to attempt to deactivate the alarm. Further, in selected embodiments, the second predetermined image can be the same as the first predetermined image. It is noted that the comparison process is similar to the process described with respect to step S206 of FIG. 2.

At step S220 the processor checks if the two images, the second captured image and the predetermined image, stored in memory mentioned in steps S216 and S218 match. If the images do not match then the process proceeds to step S216 so the user can capture another image for comparison to the second predetermined image. This process is repeated until the user adequately captures an image that matches the second predetermined image to a high enough degree such that the smart alarm system device deactivates the alarm. Accordingly, if the images do match at step S220 then the alarm is deactivated at step S222. It is noted that while two image comparisons are described herein, there is no limitation with respect to this feature. Accordingly, in selected embodiments there may be additional image comparisons when resetting the alarm or only one image comparison as described in FIG. 2. Accordingly, if the user is a heavy sleeper that often resets their alarm clock then he or she can have increasing levels of difficulty with respect to the image comparisons to ensure the user wakes up on time. Further, the threshold at which the computed difference between a captured image and stored image is deemed acceptable can be lowered each time the alarm is reset such that for later image comparisons the captured images have to be more and more exact. Again, this ensures that the user wakes up on time.

Figure 3A:
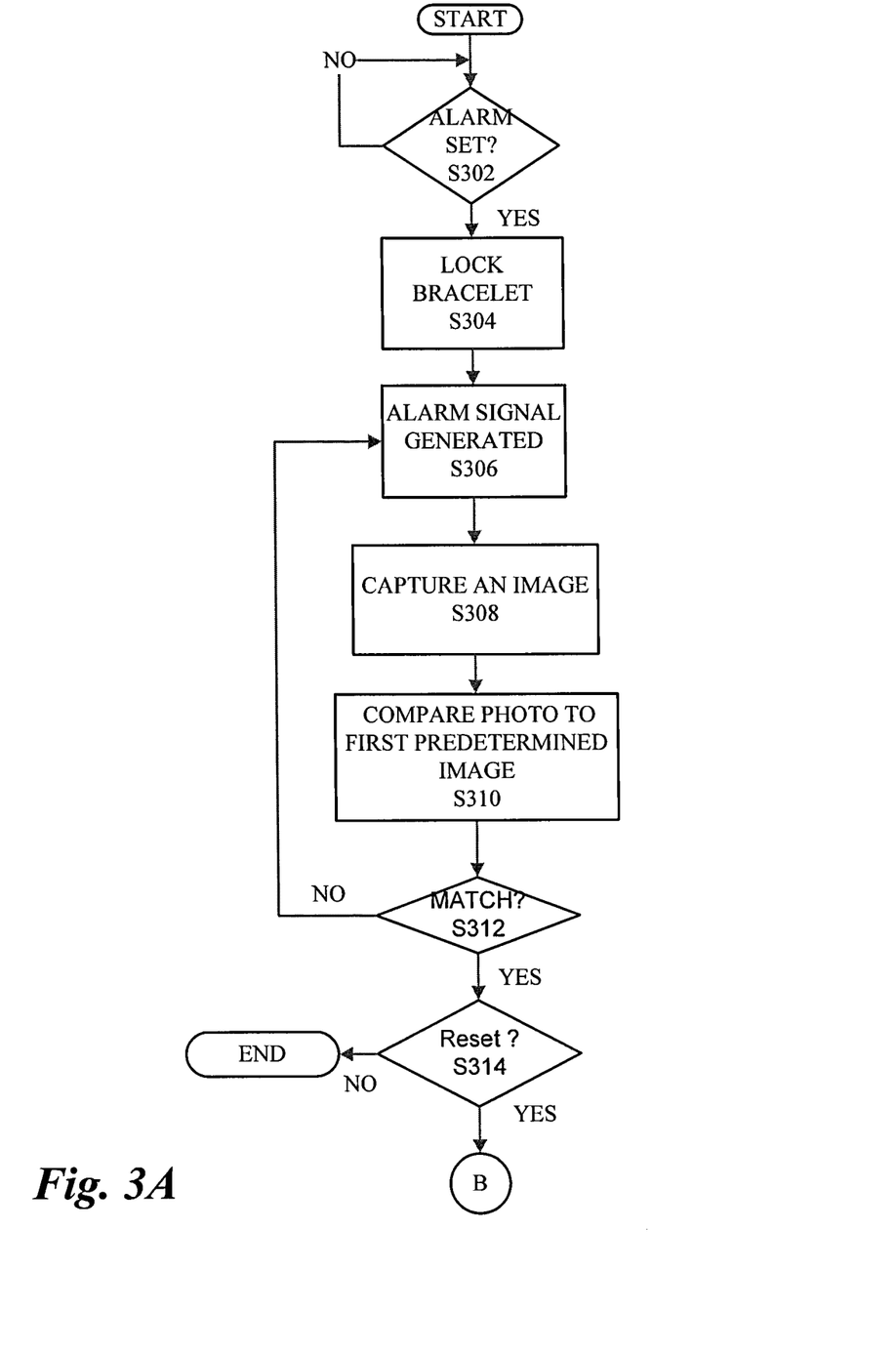
FIGS. 3A and 3B are a flowchart illustrating a process of using the alarm clock as a fascinating device according to one example.

FIG. 3A is a flowchart illustrating a process of using the smart alarm clock system device as a fastening device according to one example. The fastening device may be a bracelet with a lock 114 as shown in FIG. 1. The process begins at step S302, which is a waiting state where the smart alarm system device waits for an alarm to be set. If an alarm of the smart alarm system device has not been set, the system continues to check at step S302 until an alarm has been set. In selected embodiments, the alarm may be set via manual input, voice input or remotely via an external connection. Once an alarm has been set the system proceeds to step S304 where the bracelet is locked. The locking of the bracelet can be automatic in response to the detection of setting the alarm at step S302 or can be manual such that the user is only able to manually lock the bracelet after the alarm is set.

At step S306, it is determined that the alarm is activated and therefore an alarm signal is generated. Once the alarm signal is generated at step S306, the imaging device 112 of the smart alarm system device is used to capture an image at step S308. At step S310, the processor is programmed to compare the captured image and the first predetermined image as previously described herein. At step S312 if both images do not match then the process proceeds to step S308 at which the user must again attempt to capture an image that matches with the first predetermined image. However, if the two images do match within the predetermined threshold level of a computed difference there between, the process proceeds to step S314. At step S314 the smart alarm system device inquires, as previously described herein, as to whether the user wishes to reset the alarm for a predetermined period of time or not. If the answer is NO at step S314, then the alarm is deactivated and unlocked. However if the answer is YES at step S314, then the process proceeds to FIG. 3B, step S315.

Figure 3B:
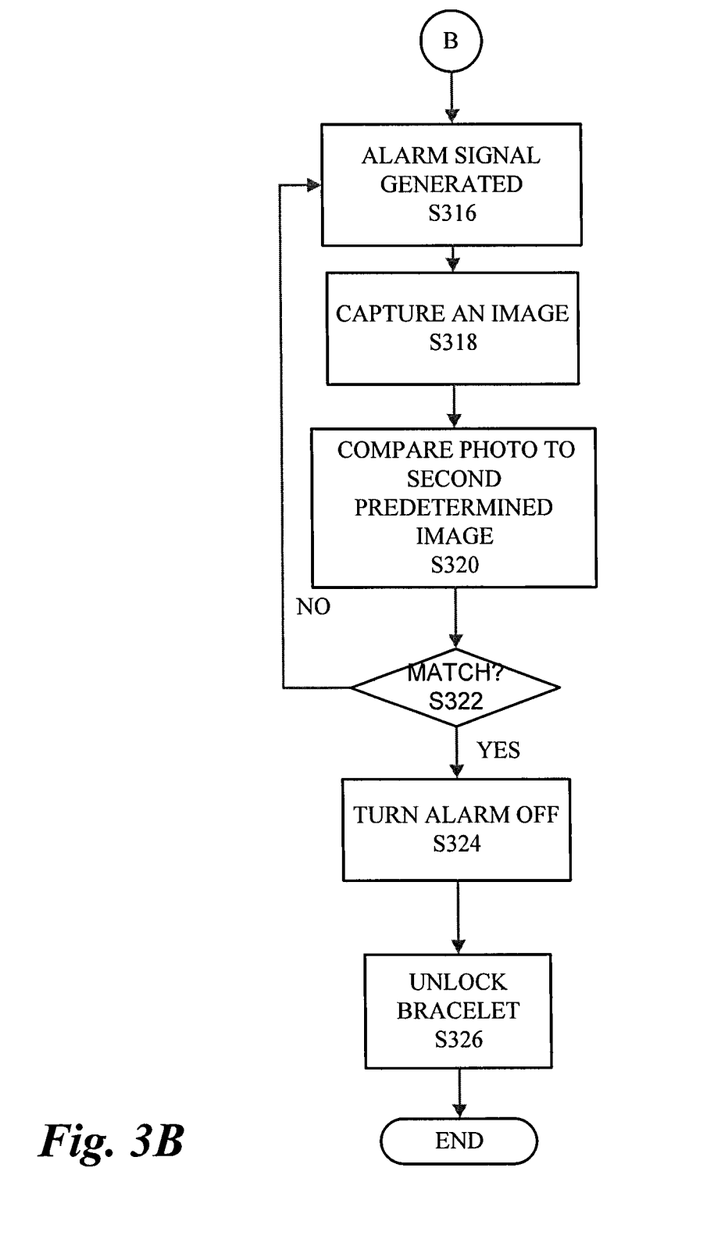

At step S315 the alarm goes off and an alarm signal is again generated for a second time based on the predetermined period of time having elapsed since the resetting of the alarm clock system device. The process then proceeds to step S316 at which point the imaging device 112 is used to capture a second image as previously described herein with respect to FIG. 2. At step S318 and as previously described herein, the processor compares the captured image in step S316 to a second predetermined image stored in memory. At step S320, if both images mentioned in steps S316 and S318 do not match, then the process proceeds to step S316 at which point additional images can be captured in an attempt to capture an image that adequately matches with the second predetermined image. However if the images do match at step S320, then the process proceeds to step S322 at which point the alarm is deactivated. Once the alarm is deactivated the bracelet is unlocked in step S324.

It is noted here that in selected embodiments, the emitter 110 may emit sound, vibration or an electrical shock to a user wearing the bracelet. In other words, the sound, vibration and/or electric shock may be emitted as the alarm signal and may not be deactivated until a user has reset the alarm or has deactivated the alarm. Further, in selected embodiments, these alarm signals may not be deactivated until the bracelet is unlocked and the bracelet is not unlocked until the computed difference between a captured image and stored image is within a predetermined threshold. This has the advantageous effect that a user may not purposefully or inadvertently take off the bracelet when sleeping and therefore prevents them from missing an alarm while also making sure the user wakes up on time.

Figure 4:
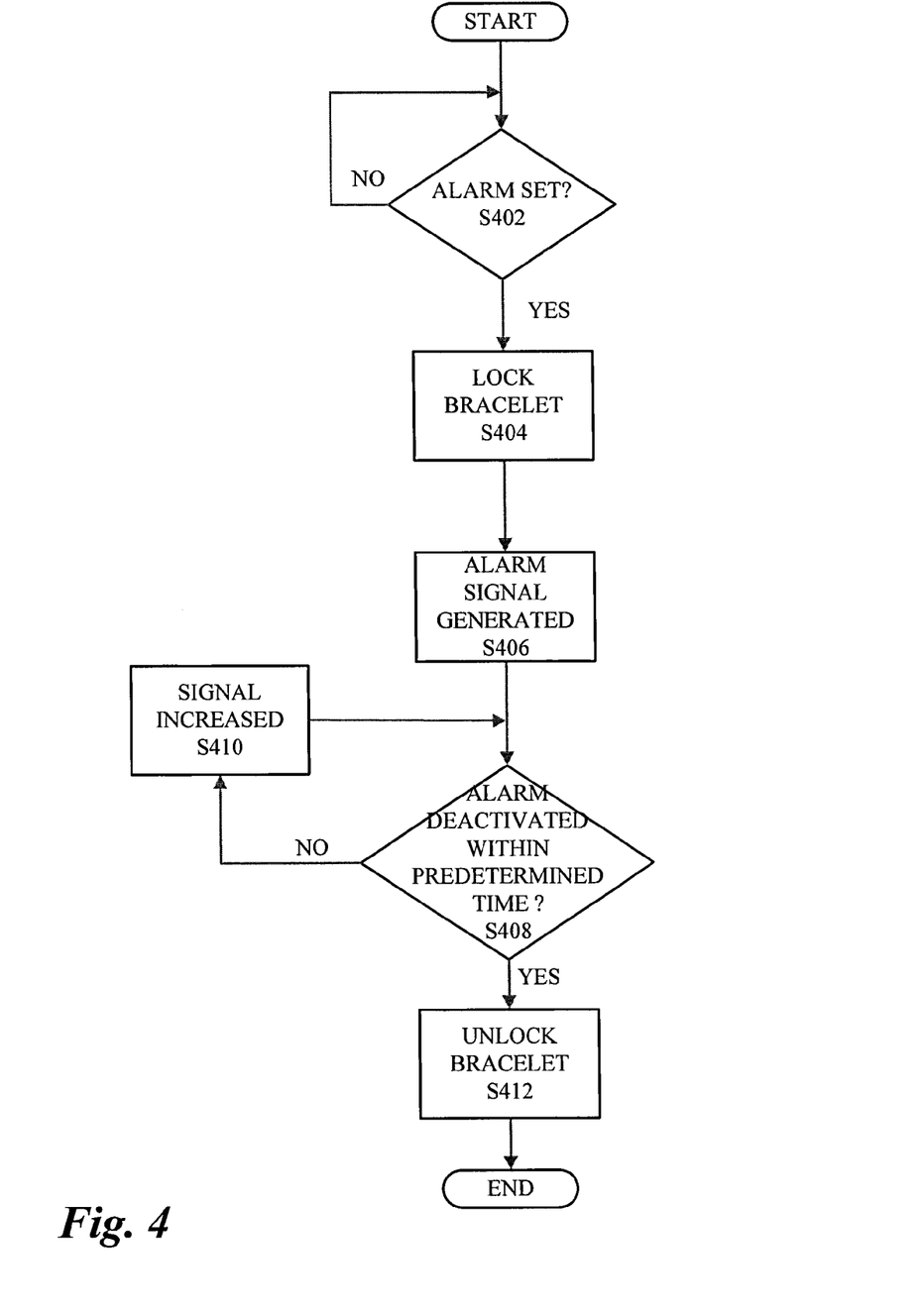
FIG. 4 is a flowchart illustrating a process of increasing the alarm signal if it was not deactivated within a predetermined amount of time according to one example.

FIG. 4 is a flowchart illustrating a process of increasing the alarm signal if it was not deactivated within a predetermined amount of time according to one example. Step S402 is a waiting state where the system waits for an alarm to be set. Once the alarm has been set, the system proceeds to step S404 where the bracelet is locked. At step S406 the alarm goes off and an alarm signal is generated. At step S408 the system checks if the alarm signal is deactivated within a predetermined amount of time. If not, then the system proceeds to step S410 where the alarm signal is increased and the process moves back to step S310. However if it was deactivated within the predetermined amount of time, then the process proceeds to step S412 where the bracelet is unlocked. It is noted that in selected embodiments this feature is similar to the processes described with respect to FIGS. 2 and 3.

In view of the discussion of FIG. 4, the feature is providing an adjustable alarm signal based on the user's response. Meaning, if the user does not deactivate the alarm within a predetermined amount of time then the signal will continue to increase until it reached a predetermined and safe threshold. The alarm signal used therein, may be any of a sound, vibration, an electric shock, or any other form of alarm signals.

Figure 5:
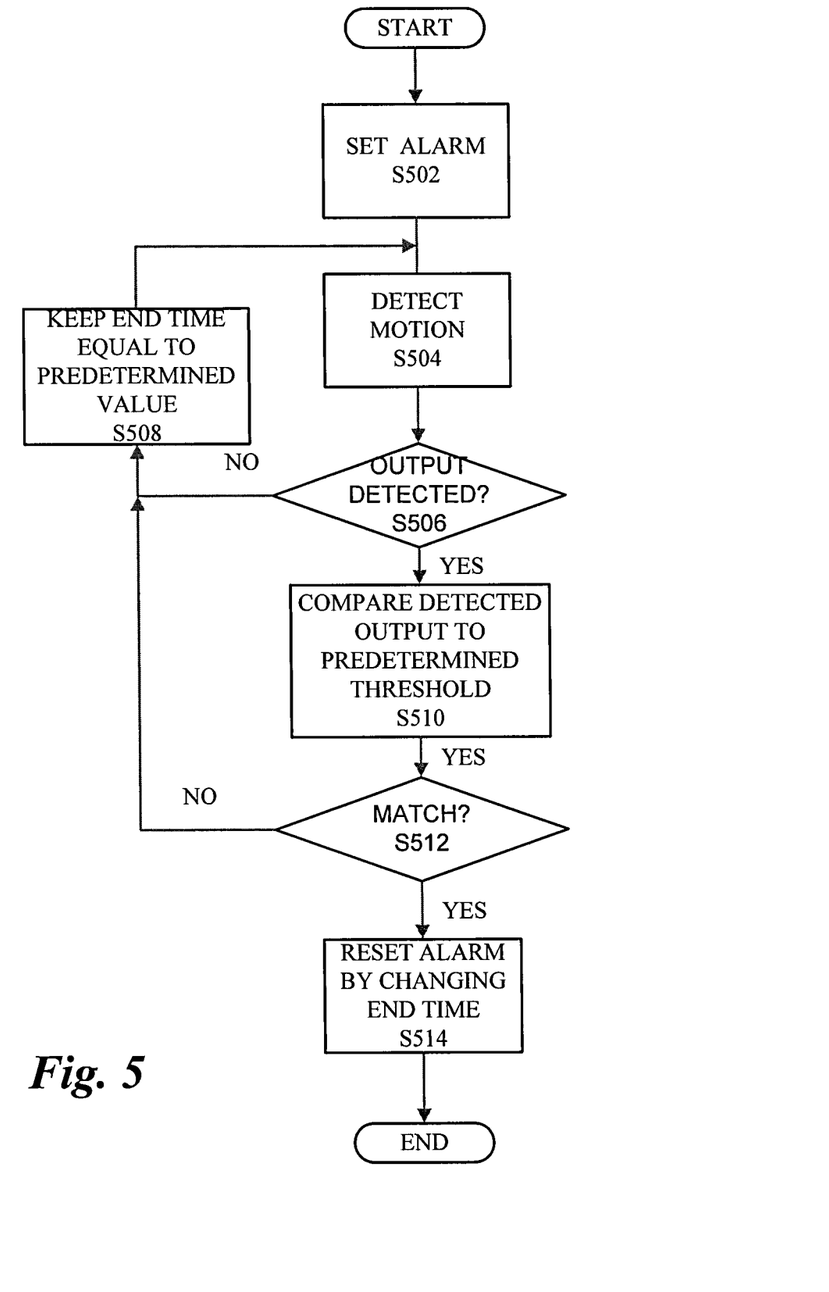
FIG. 5 is a flowchart illustrating a process of using a motion sensor to reset an alarm according to one example.

FIG. 5 is a flowchart illustrating a process of using a motion sensor 108 to reset an alarm according to one example. At step S502 an alarm is set, the process then proceeds to step S504 where the motion sensor 108 is in a ready state to detect motion. Then at step S508 the processor checks whether there was a detected output or not, the detected output can be a motion (motion of the device) of a predetermined threshold. If there was no output detected, then the process proceeds to step S506 where the processor makes sure that an end time (the time the alarm is set for) is equal to the predetermined value and proceeds to step S504. However if an output was detected, the process proceeds to step S510 at which point the processor compares the detected output to a predetermined threshold stored in memory. At step S512 the processor determines whether the detected output is greater than or equal to the predetermined threshold stored in memory. If not, then the process proceeds back to step S506, and if the detected output is equal to or greater than the predetermined threshold, the process proceeds to step S514 at which point the alarm is reset by changing its end time.

As discussed above, this embodiment is designed to be used to help users take a nap or sleep for a short predetermined amount of time. It is targeting the problem of not falling asleep immediately and getting the full amount of sleep desired, by providing the user with the ability to reset the alarm as they are falling asleep without using much energy or involving any thinking, as a shake of a predetermined strength detected by the motion sensor will reset the end time to match the period initially inputted. Further, this embodiment could be used while the fastening device (the bracelet) is attached to the user or not.

Figure 6:
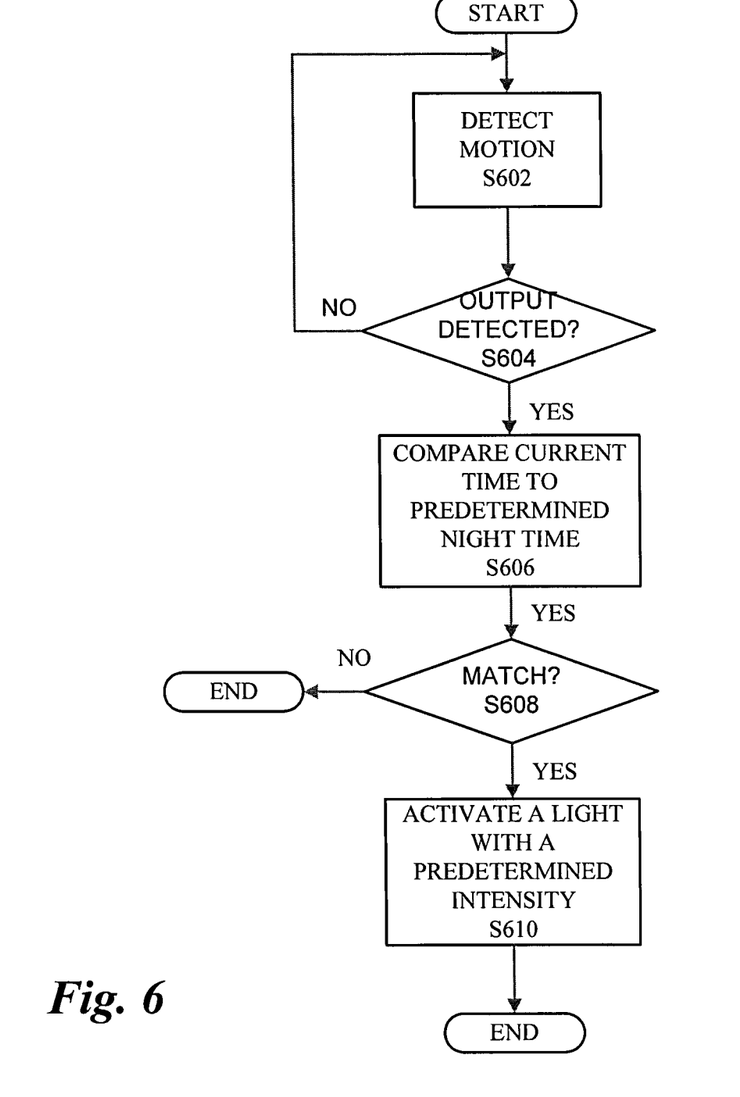
FIG. 6 is a flowchart illustrating a process of activating a light source upon activation of a motion sensor according to one example.

FIG. 6 is a flowchart illustrating a process of activating a light source 109 upon activation of a motion sensor according to one example, where the fastening device or the bracelet could be used as a light source at night time. The process starts at step S602 where it is a waiting state where the system waits to detect a predetermined amount of motion saved in memory. In step S604 the processor checks whether an output was detected or not, an output can be a predetermined amount of motion. If there was no output detected then the process proceeds to step S602. However if there was an output detected, then the process proceeds to step S606. At step S606 the processor compares the current time of the clock to a predetermined night time saved in memory. In step S608 the processor determines whether the compared times are greater than or equal to the night time. If they do not match then the system is deactivated. However if they do match, then the system proceeds to step S610 where a light of a predetermined intensity is activated for a predetermined amount of time, via light source 104.

This embodiment of the smart alarm clock system device, is important in the case of emergency or power outage. It is designed to be used at night to prevent users from tripping due to lack of sight. It is also noted that this light is activated only for a predetermined amount of time; this will help in saving the battery life of the device, as well as deactivating the device in the case the user fell asleep without deactivating it. An advantage is that a user can quietly activate a light at night that is of enough intensity for sight without causing any inconvenience to other people sleeping or resting in the same place.

Figure 7:
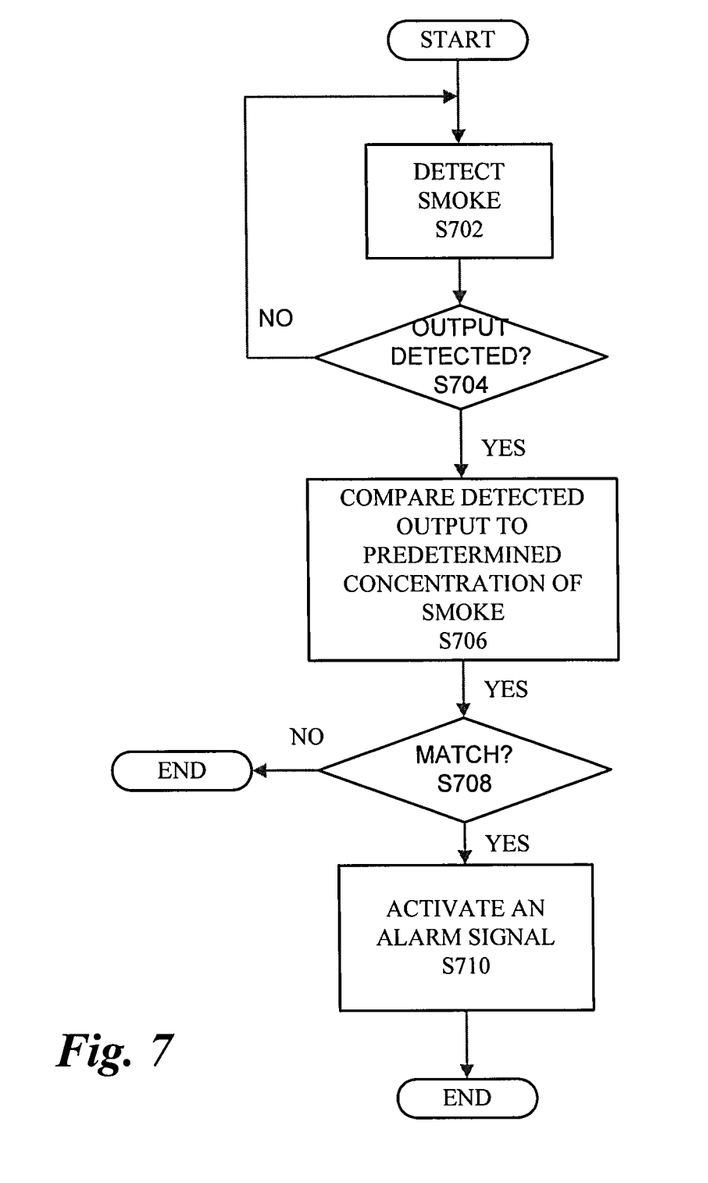
FIG. 7 is a flowchart illustrating a process of activating an alarm signal in response to smoke detection according to one example.

FIG. 7 is a flowchart illustrating a process where the device 100 could be used as a fire alarm. Step S702 is a waking step where the system waits to detect smoke. In step S704 the processor checks whether a predetermined concentration of smoke was detected or not. If not then the process proceeds to step S702. However if there was an output detected, the process proceeds to step S706 where the processor compares the detected output of smoke to a predetermined concentration of smoke stored in memory. In step S708 the processor checks if the two values compared are greater than or equal to the threshold. If not, then the system is deactivated. However if they are, then the system proceeds to step S710 where an alarm signal is activated.

This embodiment provides a lot of advantages, as the smart alarm clock system device 100 could be used for people with disabilities, where if the user is blind of deaf then the processor could be programmed accordingly to warn the user either through light, vibration or similar alarm signals, which in the case of fire or emergency can save a lot of time and effort. It is also important, as heavy sleepers are also a challenge for the regular fire alarm, this will increase the probability a user responds to an alarm since it is a single user targeted alarm to save lives and ensure people don't miss fire alarm.

Next, a hardware description describing the smart alarm system device 100 according to exemplary embodiments is described with reference to FIG. 8.

Figure 8:
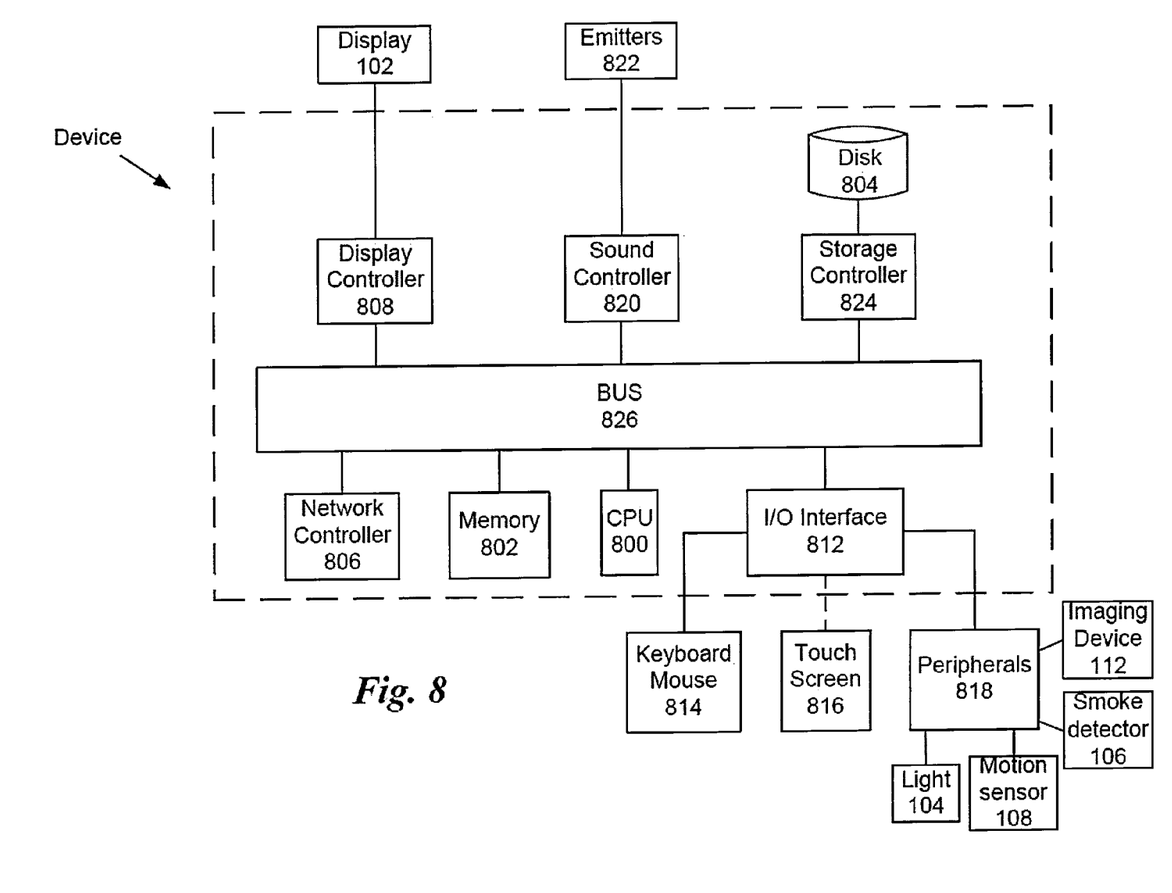
FIG. 8 illustrates an exemplary hardware configuration of the system server according to one example.

In FIG. 8, the smart alarm system device 100 includes a CPU 800 which performs the processes described above. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as another server or computer.

Further, the above-noted processes may be provided as a utility application, background daemon, or component of an operating system, or combination thereof, executing in conjunction with CPU 800 and an operating system such as Microsoft Windows 8, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The smart alarm system device 100 in FIG. 8 also includes a network controller 806, such as an Intel Ethernet PRO network interface card from Intel Corporation of America, for interfacing with network 806. As can be appreciated, the network 806 can be a public network, such as the Internet, or a private network such as an LAN or WAN network, or any combination thereof and can also include PSTN or ISDN sub-networks. The network 806 can also be wired, such as an Ethernet network, or can be wireless such as a cellular network including EDGE, 3G and 4G wireless cellular systems. The wireless network can also be WiFi, Bluetooth, or any other wireless form of communication that is known.

The smart alarm system device 100 further includes a display controller 806, such as a NVIDIA GeForce GTX or Quadro graphics adaptor from NVIDIA Corporation of America for interfacing with display 102, such as a Hewlett Packard HPL2446w LCD monitor. A general purpose I/O interface 812 interfaces with a keyboard and/or mouse 814 as well as a touch screen panel 816 on or separate from display 102. General purpose I/O interface also connects to a variety of peripherals 818 including printers and scanners, such as an OfficeJet or DeskJet from Hewlett Packard. They may also include a light source 104, a smoke detector 106, a motion sensor 108, and an imaging device 112. While the terms light source, smoke detector, motion sensor and imaging device are used here; these terms are understood to mean an LED or any other light source, a photoelectric or a physical process or a smoke alarm or any other smoke detectors, an accelerometer or any other motion sensors and a camera or any other imaging device, as would be understood by one of ordinary skill in the art.

A sound controller 820 is also provided in the smart alarm system device 800, such as Sound Blaster X-Fi Titanium from Creative, to interface with emitter 822 thereby providing sounds, vibrations, electric shock light and/or music. The emitter 822 can also be used to accept dictated words as commands for controlling the smart alarm system server 100.

The general purpose storage controller 824 connects the storage medium disk 804 with communication bus 826, which may be an ISA, EISA, VESA, PCI, or similar, for interconnecting all of the components of the smart alarm system server 100. A description of the general features and functionality of the display 102, keyboard and/or mouse 814, as well as the display controller 808, storage controller 824, network controller 806, sound controller 820, and general purpose I/O interface 812 is omitted herein for brevity as these features are known.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present invention are possible in light of the above teachings. It is therefore to be understood that within the scope of the appended claims, the invention may be practiced otherwise than as specifically described herein.

The invention claimed is:

1. A device comprising:
a clock configured to indicate time;
an imaging device configured to capture an image;
a memory configured to store at least one alarm time as a predetermined alarm time, an alarm period as a predetermined alarm period, a night time as a predetermined night time, and at least one captured image as a predetermined image;
an emitter configured to activate an alarm signal;
a processor programmed to
set an alarm time,
cause the emitter to activate the alarm signal when a current time of the clock corresponds to the at least one alarm time,
compare, when the alarm signal is activated and in response to capture of an image by the imaging device, the captured image to the at least one predetermined image, and
deactivate the alarm signal and reset the alarm time for the at least one pre-determined alarm period stored in memory, when the captured image corresponds to the at least one predetermined image stored in memory,
compare, when the alarm signal is reactivated and in response to capture of an image by the imaging device, the captured image to the at least one predetermined image stored in memory, and deactivate the alarm signal, when the captured image corresponds to the at least one predetermined image,
wherein the device is a fastening device, the fastening device being a bracelet including a lock.

2. The device according to claim 1, wherein the bracelet can only be locked after the processor sets the alarm time.

3. The device according to claim 1, wherein the alarm time can only be set after the bracelet is locked.

4. The device according to claim 3, wherein the lock of the bracelet can only be unlocked after the second deactivation of the alarm signal.

5. The device according to claim 1, wherein the processor is further programmed to cause, in response to the alarm signal being activated for a predetermined period of time without being deactivated, the emitter to increase strength of the alarm signal.

6. The device according to claim 1, further comprising:
a motion sensor configured to detect motion of the fastening device,
wherein the processor is further programmed to reset, in response to the motion sensor detecting a predetermined level of motion, the alarm time.

7. The device according to claim 6, wherein the emitter is further configured to emit, in response to the motion sensor detecting a predetermined level of motion and current time corresponding to the predetermined night time, a light of predetermined intensity for a predetermined amount of time.

8. The device according to claim 7, further comprising:
an ionization or a photoelectric sensor configured to detect concentrations of smoke around the device, wherein the processor is further programmed to activate, in response to the ionization sensor detecting a predetermined smoke concentration, the alarm signal.

9. The device according to claim 6, further comprising:
an electrical unit configured to emit electrical shocks, wherein the processor is further programmed to emit, in response to the alarm signal being active for a predetermined period of time without being deactivated, an electrical shock of a predetermined intensity.

10. A method of operating a smart alarm clock system device that indicates time, comprising:
storing, in a memory, at least one alarm time as a predetermined alarm time, an alarm period as a predetermined alarm period, a night time as a predetermined night time, and at least one captured image as a predetermined image;
setting an alarm time;
activating, via an emitter, the alarm signal when a current time of the clock corresponds to the at least one alarm time;
comparing, via a processor, when the alarm signal is activated and in response to capture of an image via an imaging device, the captured image to the at least one predetermined image;
deactivating the alarm signal and resetting the alarm time for the at least one pre-determined alarm period stored in memory, when the captured image corresponds to the at least one predetermined image stored in memory;
comparing, via the processor, when the alarm signal is activated and in response to capture of an image by the imaging device, the captured image to the at least one predetermined image stored in memory; and
deactivating the alarm signal when the captured image corresponds to the at least one predetermined image,
wherein the device is a fastening device, the fastening device being a bracelet including a lock.

11. A non-transitory computer-readable medium including executable instructions, which when executed by circuitry, cause the circuitry to execute a method on a device, the method comprising:
storing, in a memory, used at least one alarm time as a predetermined alarm time, an alarm period as a predetermined alarm period, a night time as a predetermined night time, and at least one captured image as a predetermined image;
setting an alarm time;
activating, via an emitter, the alarm signal when a current time of the clock corresponds to the at least one alarm time;
comparing, via a processor, when the alarm signal is activated and in response to capture of an image via an imaging device, the captured image to the at least one predetermined image;
deactivating the alarm signal and resetting the alarm time for the at least one pre-determined alarm period stored in memory, when the captured image corresponds to the at least one predetermined image stored in memory;
comparing, via the processor, when the alarm signal is activated and in response to capture of an image by the imaging device, the captured image to the at least one predetermined image stored in memory; and
deactivating the alarm signal when the captured image corresponds to the at least one predetermined image,
wherein the device is a fastening device, the fastening device being a bracelet including a lock.

12. The method according to claim 10, further comprising:
causing, in response to the alarm signal being activated for a predetermined period of time without being deactivated, the emitter to increase the strength of the alarm signal.

13. The method according to claim 10, further comprising:
detecting via a motion sensor, the motion of the fastening device; and resetting, via the processor and in response to the motion sensor detecting a predetermined level of motion, the alarm time.

14. The method according to claim 13, further comprising:
emitting, in response to a motion sensor detecting a predetermined level of motion and current time corresponding to the predetermined night time, a light of predetermined intensity for a predetermined amount of time.

15. The method according to claim 14, further comprising:
detecting via an ionization or a photoelectric sensor concentrations of smoke around the device; and deactivating via the processor and, in response to the ionization or photoelectric sensor detecting a predetermined smoke concentration, the alarm signal.

16. The method according to claim 13, further comprising:
emitting via the emitters and, in response to the alarm signal being active for a predetermined period of time without being deactivated, an electrical shock of a predetermined intensity.

* * * * *